J. L. KELLOGG.
APPARATUS FOR COATING FLAKES WITH SUGAR.
APPLICATION FILED JAN. 16, 1912.
1,083,685.
Patented Jan. 6, 1914.
2 SHEETS—SHEET 1.
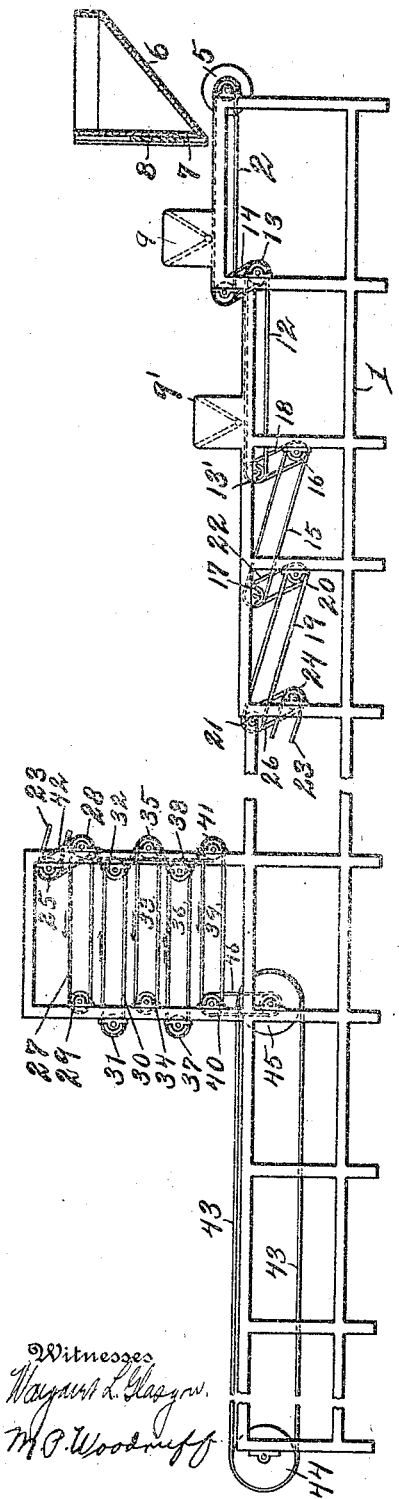
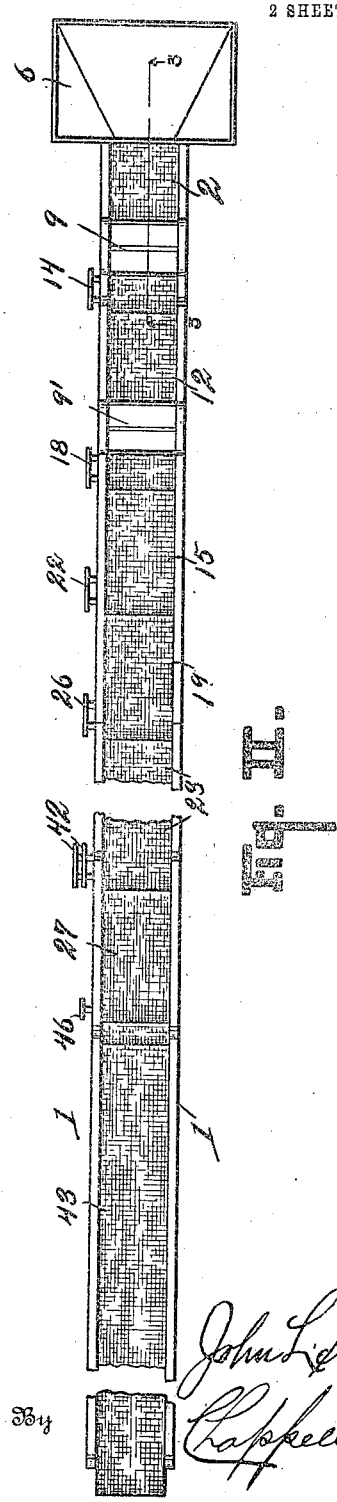

J. L. KELLOGG.
APPARATUS FOR COATING FLAKES WITH SUGAR.
APPLICATION FILED JAN. 16, 1912.
1,083,685.
Patented Jan. 6, 1914.
2 SHEETS—SHEET 2.
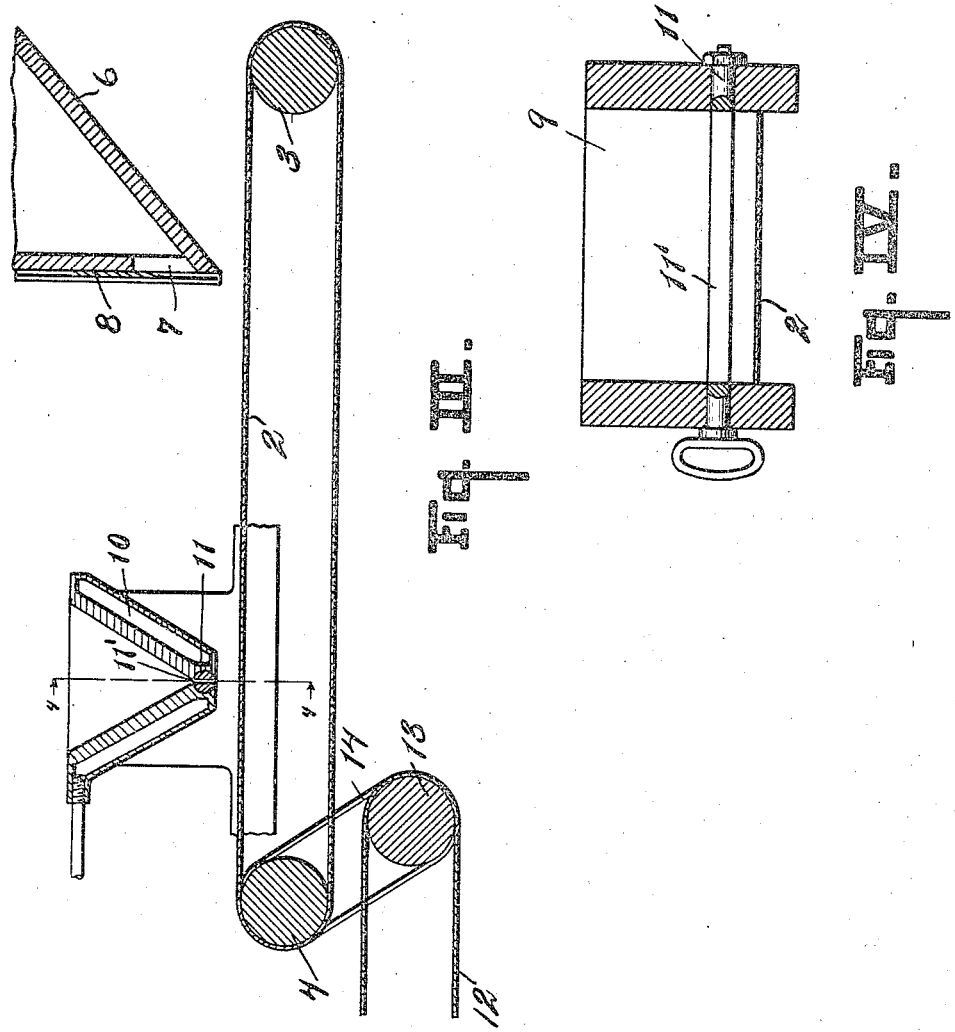

UNITED STATES PATENT OFFICE.

JOHN L. KELLOGG, OF BATTLE CREEK, MICHIGAN, ASSIGNOR TO KELLOGG TOASTED CORN FLAKE COMPANY, OF BATTLE CREEK, MICHIGAN.

APPARATUS FOR COATING FLAKES WITH SUGAR.

1,083,685.

Specification of Letters Patent.

Patented Jan. 6, 1914.

Application filed January 16, 1912. Serial No. 671,478.

*To all whom it may concern:*

Be it known that I, JOHN L. KELLOGG, a citizen of the United States, residing at Battle Creek, Michigan, have invented certain new and useful Improvements in Apparatus for Coating Flakes with Sugar, of which the following is a specification.

This invention relates to an improved machine or apparatus for coating toasted corn flakes or similar flakes with sugar and properly admixing the same.

The objects of the invention are to provide a machine which will handle such delicate material as toasted corn flakes without danger of breaking and wasting the same, which will properly incorporate the sugar with the flakes without reducing the flakes to a mere gummy mass.

Further objects, and objects relating to details of construction of the machinery and to economies of construction and operation will definitely appear from the detailed description to follow.

I accomplish the objects of my invention by the mechanism and means described in the following specification.

The invention is clearly defined and pointed out in the claims.

A machine or apparatus constituting a preferred embodiment of my invention is clearly illustrated in the accompanying drawing, forming a part of this specification, in which:

Figure I is a side elevation view of a machine embodying my invention, the same being in broken section. Fig. II is a plan view of the same. Fig. III is an enlarged detail sectional view on line 3—3 of Fig. II of the first or right hand conveyer with the feed hopper for the flakes and the feed boiler or tank for the sugar. Fig. IV is an enlarged detail sectional view on line 4—4 of Fig. III, showing details of construction of the tank or boiler.

In the drawing, similar numerals of reference refer to similar parts throughout the several views, and the sectional views are taken looking in the direction of the little arrows at the ends of the section lines.

Considering the numerals of reference, the main frame 1 of my machine is like a long bench or table with numerous supporting legs. Toward the right hand end of this bench is an elevated endless conveyer 2 in horizontal position disposed over rollers 3—4. The conveyer is of smooth metal, and is driven by the pulley 5, which also serves to drive the whole machine. Above this conveyer is a hopper 6 having a slot or feed opening 7, which is transverse to the conveyer and provided with a gate for regulating the delivery of the flakes upon the conveyer 2. Supported above this conveyer 2 is also a heated sugar distributing tank or boiler 9 provided with steam jacket 10 for properly heating the same. The valve 11 extends the length of this boiler, which is a V-shaped trough and contains the longitudinal slot 11' which extends transversely of the conveyer 2.

The conveyer 12 on a lower level receives the materials discharged from conveyer 2 and carries them forward to a second sugar distributing tank 9', which, with connections and valves, is in all particulars precisely the same as the sugar distributing tank 9. This conveyer 12 is carried on rolls 13—13' in a horizontal position and is driven by a belt and pulley connection 14 from the roll of the preceding conveyer 2. This carries the material forward and discharges the same on the conveyer 15, which is an ascending conveyer, being supported on rolls 16—17 and is driven by belt and pulley connections 18. This carries the material up and drops it onto a second ascending conveyer 19, which is carried on rolls 20—21 and is driven by a belt and pulley connection 22. This delivers the material to a further ascending endless conveyer 23 which carries the same to a considerable height. The conveyer 23 is supported on the rolls 24—25 and passes the material to a cooler and dryer consisting of a series of endless horizontal conveyers which are disposed one beneath the other. These pass the mixed materials down until they are finally delivered onto a long slow moving conveyer from which the same is taken by the packers and put into suitable packages, or is delivered to suitable devices for that purpose.

The upper horizontal conveyer 27, carried by rolls 28—29, receives the material from the ascending conveyer 23 indicated in broken section and carries the same to the left on Fig. I and drops it down onto the horizontal conveyer 30. The endless conveyer 30, carried on rolls 31—32, delivers the material onto the endless horizontal conveyer 33. The conveyer 33 is supported by rolls 34—35 and delivers onto the conveyer 36. The conveyer 36 is supported on the rolls 37—38 and delivers onto the conveyer 39 which is supported on the rolls 40—41. These conveyers are properly connected together by pulley and belt connections 42, and are supported on a suitable upright frame part 42'. The material is delivered from the conveyer 39 to the long conveyer 43 supported on rolls 44—45, where the material advances gradually and is taken off by operatives and put into packages or is delivered to any suitable packaging devices.

The operation of the apparatus is very simple, and yet at the same time, it is very effective and avoids any breakage and powdering of the delicate toasted corn flakes or other flaked food which may be passed through the same. The machine is especially intended to treat toasted corn flakes and apply thereto a coating of sugar or sugar composition. A quantity of butter is usually mixed with the sugar to prevent its granulation and to insure its delivery in proper condition to form the best compound when applied to the flakes. The flakes are supplied from the hopper 6 and are allowed to pass in a considerable mass or layer, preferably from an inch to an inch and a half thick, onto the conveyer 2. This conveyer is of metal slightly oiled so that the melted sugar and sugared flakes will not adhere thereto. This conveyer 2 passes under the heated feed tank 9 and the melted sugar, or sugar compound, is delivered through the slot 11'. The sugar contains little or no water and is maintained in the fluid condition by the strong heat of the steam jacket. It descends through the air but a very short distance and strikes the flakes in liquid form and trickles through the same before it becomes cooled and set. The flakes drop off this conveyer 2 before the sugar fully hardens, and in so doing the flakes are thoroughly admixed with the melted or partially melted sugar and the untreated lighter flakes are brought to the upper surface again. The conveyer 12 carries the partially sugared mass forward and an additional quantity of the melted sugar is dropped upon the flakes which are again immediately dropped upon the ascending conveyer, which moves rather rapidly, and the flakes are then dropped onto the succeeding elevating conveyers 19, and finally onto the elevating conveyer 23, when they are passed upwardly to the horizontal conveyer 27 and descend gradually from conveyer to conveyer and finally pass out onto the long conveyer 43, where the same are received by the packers and put into packages. It will thus be seen that while the sugar is in its melted condition, the mass of flakes is gently mixed with the same by turning the same over by the simple method of allowing the material to descend step by step from one endless conveyer to another. As the conveyers are of metallic construction and are slightly oiled in use, the flakes and sugar do not adhere to the same in any way, and the entire mass is evenly and properly mixed, so that a small quantity of sugar is distributed evenly throughout the mass of flakes and makes a highly satisfactory confection, comparable with sugared popcorn but much more delicate in texture.

The structure embodying my invention here illustrated is shown with rolls and endless belt structures. I desire to state that sprocket wheel structures with flights are also contemplated and used by me, but as these devices are well known equivalents, the one of the other, a sprocket wheel and chain, certainly being the equivalent in a broad sense of a belt and wheel, and sprocket wheels and chains with flights being the full equivalent of the rollers and belts as constituting endless conveyers, I merely state this fact without illustrating the structures in detail.

I have not illustrated details of my machine such as would be readily supplied by a mechanic skilled in the art. I desire to claim the specific arrangement of parts, and also to claim the invention broadly, as indicated in the appended claims.

Having thus described my invention, what I claim as new and desire to secure by Letters Patent is:

1. A machine for coating flakes and admixing the same with sugar consisting of a suitable frame, a system of endless conveyers thereon suitably connected together and disposed to deliver successively one to another; a feed hopper with gate transverse to the first of said conveyers, which is horizontally disposed, to deliver a layer of flakes thereto; a steam jacketed feed tank with a valved slot transverse to the said conveyer for delivering melted sugar or sugar compound onto the layer of said flakes as it is advanced; a steam jacketed feed tank disposed above the second conveyer, which is horizontally disposed, with a valved slot transverse to said conveyer for delivering melted sugar or sugar compound thereto whereby melted sugar is successively delivered to the layer of advancing and agitated flakes, which layer is delivered thereafter successively from conveyer to conveyer, some of which are inclined upwardly, until the same is thoroughly admixed with the sugar and the sugar cooled and hardened and the mass fully dried, as specified.

2. A machine for coating flakes and admixing the same with sugar compound consisting of a suitable support, a system of endless conveyers thereon disposed to deliver successively one to another; a suitable means of delivering a layer of flakes to the said conveyers, a suitable means of delivering a thin heated stream of melted sugar to successive conveyers as the flakes are advanced by the converters, whereby the heated sugar is delivered to the agitated flakes and admixed and the sugar cooled and hardened and the mass fully dried, as specified.

3. A machine for coating flakes and admixing the same with sugar compound consisting of a suitable support, a system of endless conveyers thereon disposed to deliver successively one to another, a suitable means of delivering a layer of flakes to the said conveyers, a suitable means of delivering a thin heated stream of melted sugar to the layer of flakes as they are advanced, whereby the heated sugar is delivered to the agitated flakes and admixed and the sugar cooled and hardened and the mass fully dried, as specified.

It witness whereof, I have hereunto set my hand and seal in the presence of two witnesses.

JOHN L. KELLOGG. [L. S.]

Witnesses:
  CHAS. M. MARBLE,
  C. H. HUGHES.